Oct. 7, 1958

L. J. LONG 2,855,008

TRAILER MOUNTED POWER SAW RIG

Filed May 16, 1955

INVENTOR
Louis J. Long
BY
Nathaniel Ely
ATTORNEY

Oct. 7, 1958

L. J. LONG 2,855,008

TRAILER MOUNTED POWER SAW RIG

Filed May 16, 1955

INVENTOR
*Louis J. Long*
BY
ATTORNEY

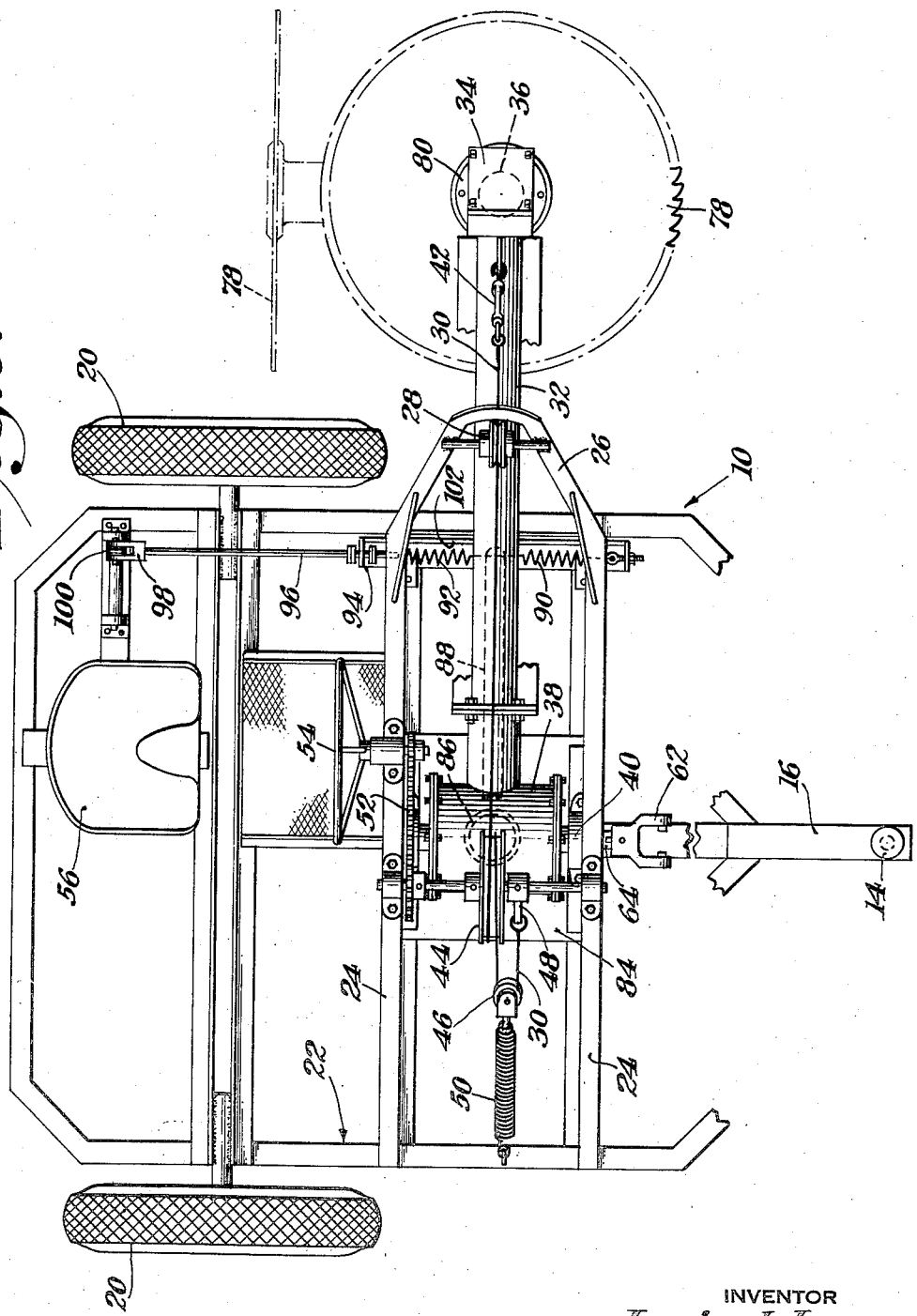

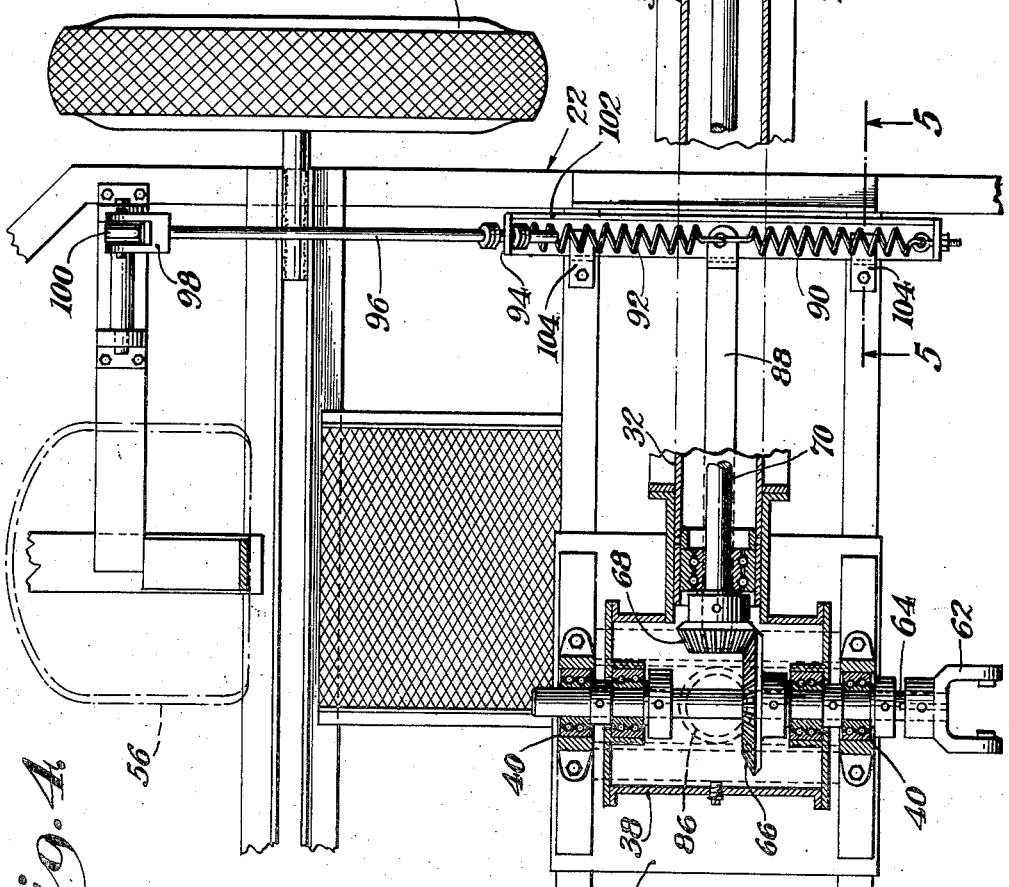

United States Patent Office 2,855,008
Patented Oct. 7, 1958

2,855,008

TRAILER MOUNTED POWER SAW RIG

Louis J. Long, Brandon, Vt.

Application May 16, 1955, Serial No. 508,560

6 Claims. (Cl. 143—43)

This invention relates to a portable saw trailer rig which may be drawn and motivated by a typical farm tractor.

With the advent of the farm tractor, there has been a great tendency to utilize the power available for many farm purposes, not the least of which is cutting wood, cleaning off brush and similar operations. As a result, many inventions have been made along the line of "adapters" and "accessories" for tractors but in almost all cases they are individually adaptable to only one or a very few of the available tractor models.

It has also become clear that any accessory or attachment that will be required for the transfer of from two to twenty or more horsepower, especially for saw operation, must be unusually rugged to avoid serious accidents even from normal sawing hazards. It is nearly impossible adequately to guard a saw when it is being used for field clearing and it is even more difficult to guide a saw of thirty to forty eight inches in diameter unless the entire framework is carefully designed and rigidly secured. Practically no such framework is available for quick attachment to any tractor and probably no such construction could ever be devised to fit all of the numerous models and styles of tractors.

It is my belief that a trailer rig with a saw mounted thereon is an indispensible piece of apparatus for farms and for highway and other "right of way" clearance purposes. Almost invariably all available tractors, whether wheeled or crawler-track type have draw bar facilities which permit simple coupling of a trailer. Furthermore, a very large proportion of present tractors are equipped with power take off mechanisms at the rear and in such cases, my trailer rig is almost instantaneously coupled up to its draft as well as its motivating power.

A trailer rig also has the primary advantage that it can be specifically designed for its desired purpose. If it is only constructed for brush cutting, the expected stresses are easily analyzed and the frame work can be light weight as well as rigid.

The principal feature of my invention is to provide a completely mobile trailer rig for a power saw in which there is complete flexibility of saw positioning and in which the power drive for the saw may be readily connected to the usual power take off mechanism of the tractor. A further feature of the invention is the simplicity of the saw carrying trailer which is readily connected to any of the present commercial tractors both for towing and for saw power supply.

A still further feature of the invention is to provide a substantially universal mount for a power driven clearing saw whereby, with the minimum of adjustments, the saw may be mounted for cutting on either side of the rig or moved into a vertical cutting position for cutting logs at fixed points.

The features above are included in a construction that is economical to construct, simple to operate, rugged under field clearing or log cutting service and adequately powered for heavy duty service.

Further objects and advantages of my invention will appear from the following description of a preferred form of embodiment of my invention and as illustrated in the attached drawings in which:

Fig. 3 is a top plan view of the rig shown in Fig. 3.

Fig. 4 is also a plan view, with parts in section of the rig particularly showing the saw shifting mechanism.

Fig. 5 is a vertical section taken along the line 5—5 of Fig. 4 showing other features of the saw shifting mechanism.

Figure 1:
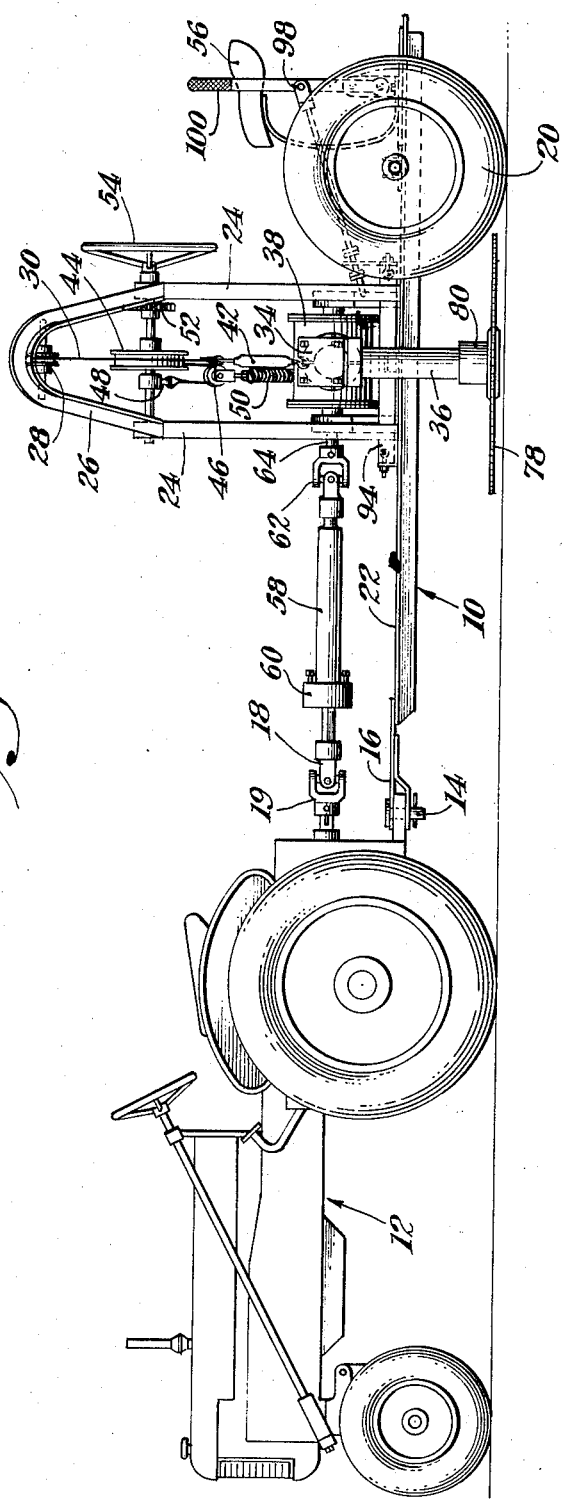
Fig. 1 is a side elevation of the tractor trailer apparatus showing the saw in normal roadside clearing position.

The saw rig shown in Fig. 1 as a preferred form of embodiment of my invention is generally represented at 10 and is adapted to be transported and powered by a typical tractor generally represented at 12. This is accomplished in part by the customary draft linkage 14 interconnected with the tongue 16 of the trailer rig and by the interconnection of the power coupling 18 with the power take off mechanism of the tractor generally shown at 19. As the tractor is not a part of my invention, no further description of it appears necessary.

The saw rig 10 is preferably a two wheeled chassis having wheels at 20 which support a skeleton frame 22 as shown in Fig. 3 and on which is mounted a saw boom lifting structure. This structure includes a vertically extending framework 24 having an extension arm 26 carrying a pulley 28 over which runs the flexible saw boom cable 30.

The saw boom itself is a tubular member 32 having on its outer end a gear box 34 which in turn carries the saw column 36. The saw boom 32 is secured on its inner end to the gear housing assembly 38, by means of suitable bolting flanges and bolts. It may be provided with reinforcing webs if desired.

Figure 2:
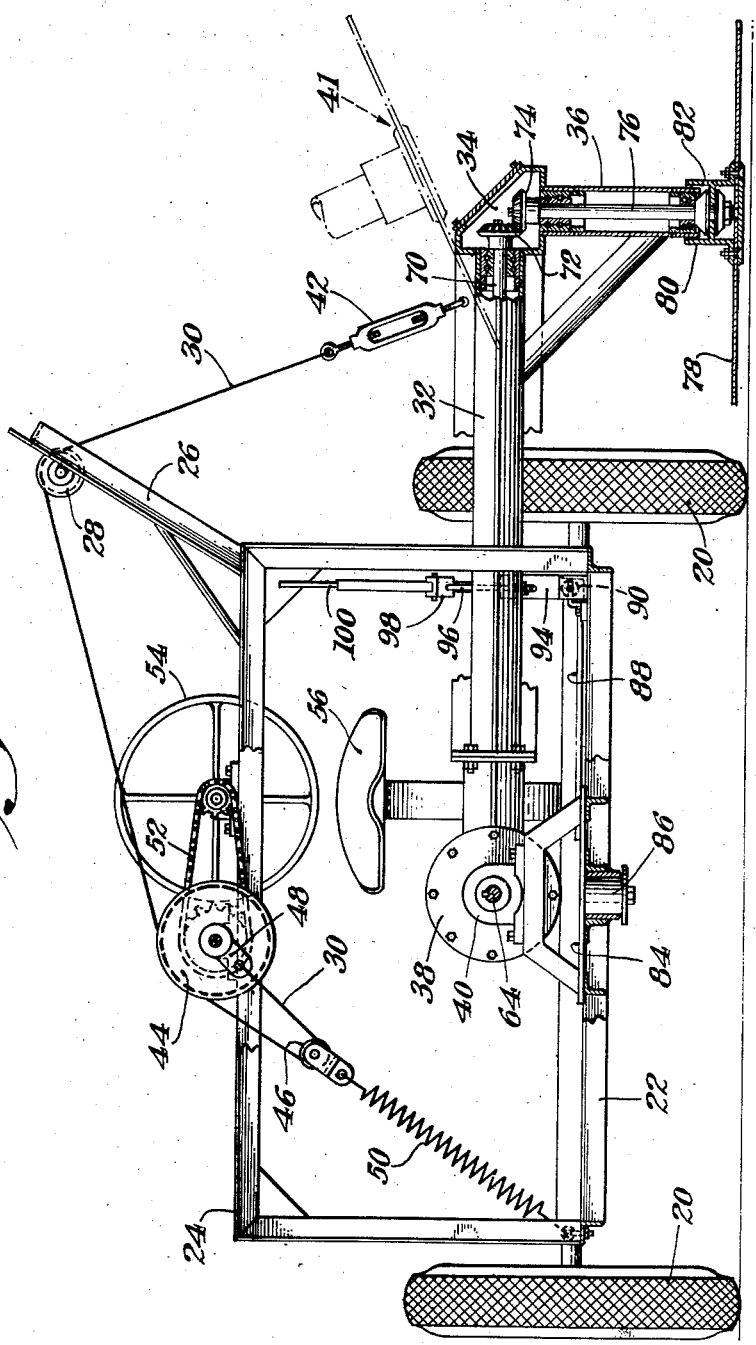
Fig. 2 is an elevation from the front of the saw rig.

The drive shaft and gear housing assemblies 64 and 38 are rotatably mounted in horizontal trunnions 40 as shown in Fig. 4, so that by pulling on the cable 30, the saw may be raised to a position 41 such as shown in broken lines in Fig. 2 where the saw is completely clear of the ground.

The cable tensioning mechanism may be of any convenient and suitable arrangement but for my purpose I prefer to anchor one end, as by the turnbuckle 42 to the outer end of the saw boom. The cable then passes over pulley 28 and thence over sheave 44, around pulley 46 and finally the free end is anchored at 48. Pulley 46 is conveniently spring tensioned by spring 50. With two or more wraps of the cable 30 around sheave 44 and with the tension of spring 50, it is usually unnecessary to secure the cable to the sheave for the desired elevation of the saw boom as the friction effect is enough. The spring tension is adjusted to hold the saw approximately at mid-position.

Sheave 44 may be rotated by the linkage (chain belt or spur gear) 52 under control of hand wheel 54. This wheel is conveniently mounted with respect to the operator's seat 56 at the rear of the saw rig. Conveniently, a gear ratio of about 3 to 1 is found most effective for quick action and minimum restraining demands on the operator to hold the saw level.

The driving mechanism for the saw includes, as previously mentioned, and as shown in Fig. 1, the power take off coupling 19 which drives the splined shaft 58 preferably having a safety "slip" clutch 60. Suitable universal joints 18 and 62 are used for continuous drive when the tractor and rig are moving through curves in the horizontal or vertical plane.

As more clearly shown in Fig. 4, the power input number 64 drives bevel gear 66 which in turn drives pinion gear 68 which is mounted on the saw boom drive shaft 70. This has the pinion gear 72 at its other extremity and such gear directly drives gear 74 on the saw mandrel 76 (Fig. 2). The saw 78 is mounted on the other end of the mandrel.

It will be appreciated that appropriate bearings and seals and lubricating devices will be used in accordance with standard practice. A special feature of the invention however is the use of a "grass" cup 80 as shown in Fig. 2, such cup surrounding the lower end of the saw mandrel and mounted for rotation with the saw. This cup tends to avoid winding up fibrous material such as grass and roots which are thrown free of the lower bearing by this construction. A transverse hole 82 may be provided for drainage of water.

Ordinarily my saw rig is arranged for cross-country clearing of brush, small trees, etc. and in such case the boom is lowered to a suitable clearing position after which the tractor is started in low gear. At the same time the power take off energizes the saw and all the operator has to do is avoid coming into contact with rocks or similar obstacles. Normal contact with even fairly large brush and small trees is not objectionable and if extraordinary demands are made on the saw, the clutch 60 will slip to avoid gear damage.

I have found that with a conventional saw of thirty to forty eight inches in diameter, I can operate the tractor in a low gear with a ground speed of 2 miles per hour or about 3 feet per second and continuously cut brush and trees up to five inches in diameter if pine, or up to three inches in diameter if of harder wood such as oak. If there are lesser obstacles, continuous speeds of five feet per second or more can be maintained.

For tree cutting, the tractor moves the rig into a suitable position adjacent the tree and the operator can move the saw through the tree by the following mechanism.

As noted in Fig. 4, the gear casing 38 is mounted on plate 84 which in turn is carried by a trunnion 86 on the chassis. The boom 32 of the saw is thus free to move in an arc about the center of the chassis and in a plane parallel to the ground. The plate 84 has a tongue 88 which is secured by two heavy springs 90 and 92, one of which is fixed at 94 the forward end of member 102. The other spring 92 is fastened to rear end of member 102.

By moving the hand lever 100 forward as shown in Fig. 1, the linkage 96 will move the angle member 102 as shown in Fig. 5 under the guide clips 104 to carry the springs 90 and 92 to a forward position and in turn move the arm 88 and the saw boom 32 about an arc the center of which is the trunnion 86. A rearward movement of the hand lever will have the opposite effect. Hand lever 100 is pinned in a central position when cutting brush.

Generally I find that an arc of about 10° which will result in a saw movement of about 12 inches, is adequate for almost all horizontal cutting. With the spring mount, shocks of cutting when the tractor is in motion are readily absorbed and adequate tension can be provided for rapid cutting.

While the preferred structure is the gear driven type as shown, it will be understood that other types of drives are clearly within the normal range of modifications. Furthermore, although I have shown a saw as a preferred rotary tool, other elements such as centrifugally actuated sickle blades could be used.

I have also mentioned that the saw can be moved into a vertical position for fixed position cutting. This is accomplished by removing the bolts from the flanges on the saw boom member and turning the boom through ninety degrees.

If it is desired to operate the saw from the right hand side of the rig, the saw boom would be rotated through one hundred eighty degrees on the horizontal and then the entire saw boom and gear box rotated one hundred and eighty degrees about the trunnions 40, by changing the relative positions of support 26, with pulley 28, sheave 44 and eye-bolt fastening of spring 50.

While for economy it is desirable to use a power input to the gear box 38 from a tractor power take off, it will be obvious that a self-contained power unit may be used if found desirable.

I claim:

1. A chassis mounted power saw rig comprising a power transmisison mounted on said chassis for limited rotational movement about a vertical axis including a generally horizontal driving shaft extending longitudinally of said chassis, a boom mounted on said transmission for vertical swinging movement about a generally horizontal axis, said boom extending generally transversely of said chassis and normally generally horizontally therebeyond, a tool mandrel rotatably mounted adjacent the outer end of said boom generally at right angles thereto extending downwardly therefrom and having a free end for rotating about a generally vertical axis a tool mounted thereon, means for driving said tool mandrel from said driving shaft, means for swinging said boom about its horizontal axis to raise and lower a tool mounted on said mandrel to adjust the operative position thereof and to raise said tool into inoperative position, and restraining means for resiliently restraining movement of said transmission about its vertical axis to maintain said boom normally in a generally fixed position extending transversely of said frame, said restraining means including opposed spring means connected at their adjacent ends to a portion of said transmission and at their remote ends to said chassis and means for longitudinally shifting the remote ends of said spring to move said transmission about its vertical axis to swing said boom in a horizontal arc.

2. A saw rig as claimed in claim 1 in which the chassis is provided with at least two ground engaging wheels.

3. A saw rig as claimed in claim 1 in which the chassis is provided with a superstructure, said superstructure having a saw boom lifting arm and a flexible linkage interconnected with the saw boom to raise and lower said saw boom.

4. A saw rig as claimed in claim 3 in which the flexible linkage includes a flexible cable, a freely rotatable sheave over which said cable is passed, and hand operated means to rotate said sheave.

5. A saw rig as claimed in claim 1 in which the saw boom is a tubular member having a flange at its inboard end, a cooperating flange on the power transfer mechanism, and means to bolt said flanges together so that said saw may be positioned in a horizontal or vertical plane.

6. A trailer mounted power saw rig for use with a tractor of the type having a drawbar and a power takeoff comprising a trailer having a frame, a pair of ground wheels mounted adjacent one end of said frame and coupling means mounted adjacent the other end of said frame for attaching said trailer to said drawbar and a power saw rig mounted generally centrally on said frame adapted to be driven from said power takeoff, said rig comprising a power transmission mounted on said frame for limited rotational movement about a vertical axis, said transmission including a generally horizontal shaft having a bevel gear mounted thereon, said shaft extending forwardly and being provided with coupling means for attachment to said power takeoff, a tubular boom mounted on said transmission for vertical swinging movement about the axis of said shaft, said boom extending generally transversely of said frame and normally generally horizontally beyond said frame, a tool mandrel having a driving gear rotatably mounted adjacent the outer end of said boom generally at right angles thereto and extending generally downwardly therefrom and having a free end for rotating about a generally vertical axis a tool mounted thereon, means for driving said tool mandrel from said shaft including a shaft mounted within said tubular boom and having gear means thereon engaging said transmission gear and said tool mandrel driving gear and boom operating means for swinging said boom about its horizontal axis to raise and lower a cutter tool mounted on said mandrel to adjust the operative position thereof and to raise said tool into inoperative position, said means including a boom-lifting arm, a manually operable rotatable sheave, flexible cable means extending therebetween, and spring means supporting a major portion of the weight of said boom for counterweighing said boom, restraining means for resiliently restraining movement of said transmission about said vertical axis to maintain said boom normally in a generally fixed position extending transversely of said frame, said restraining means including opposed spring means connected at their adjacent ends to a portion of said transmission and at their remote ends to said frame, and manually operated means for longitudinally shifting the remote ends of said springs to move said transmission about its vertical axis to swing said boom in a horizontal arc.

References Cited in the file of this patent
UNITED STATES PATENTS

| | | |
|---|---|---|
| 638,553 | Burke | Dec. 5, 1899 |
| 1,316,743 | Roche et al. | Sept. 23, 1919 |
| 1,318,324 | Keon | Oct. 7, 1919 |
| 1,447,543 | Gessman | Mar. 6, 1923 |
| 1,447,606 | Seymour | Mar. 6, 1923 |
| 1,592,656 | Corona | July 13, 1926 |
| 2,216,971 | Farmer | Oct. 8, 1940 |
| 2,299,129 | Dickenson et al. | Oct. 29, 1942 |
| 2,354,095 | Adams | July 18, 1944 |
| 2,578,097 | Soss | Dec. 11, 1951 |
| 2,588,953 | Bausch et al. | Mar. 11, 1952 |
| 2,684,695 | Howell | July 27, 1954 |